Oct. 6, 1931.  D. C. PAGE  1,825,677
WORKHOLDING APPARATUS
Filed Nov. 19, 1928
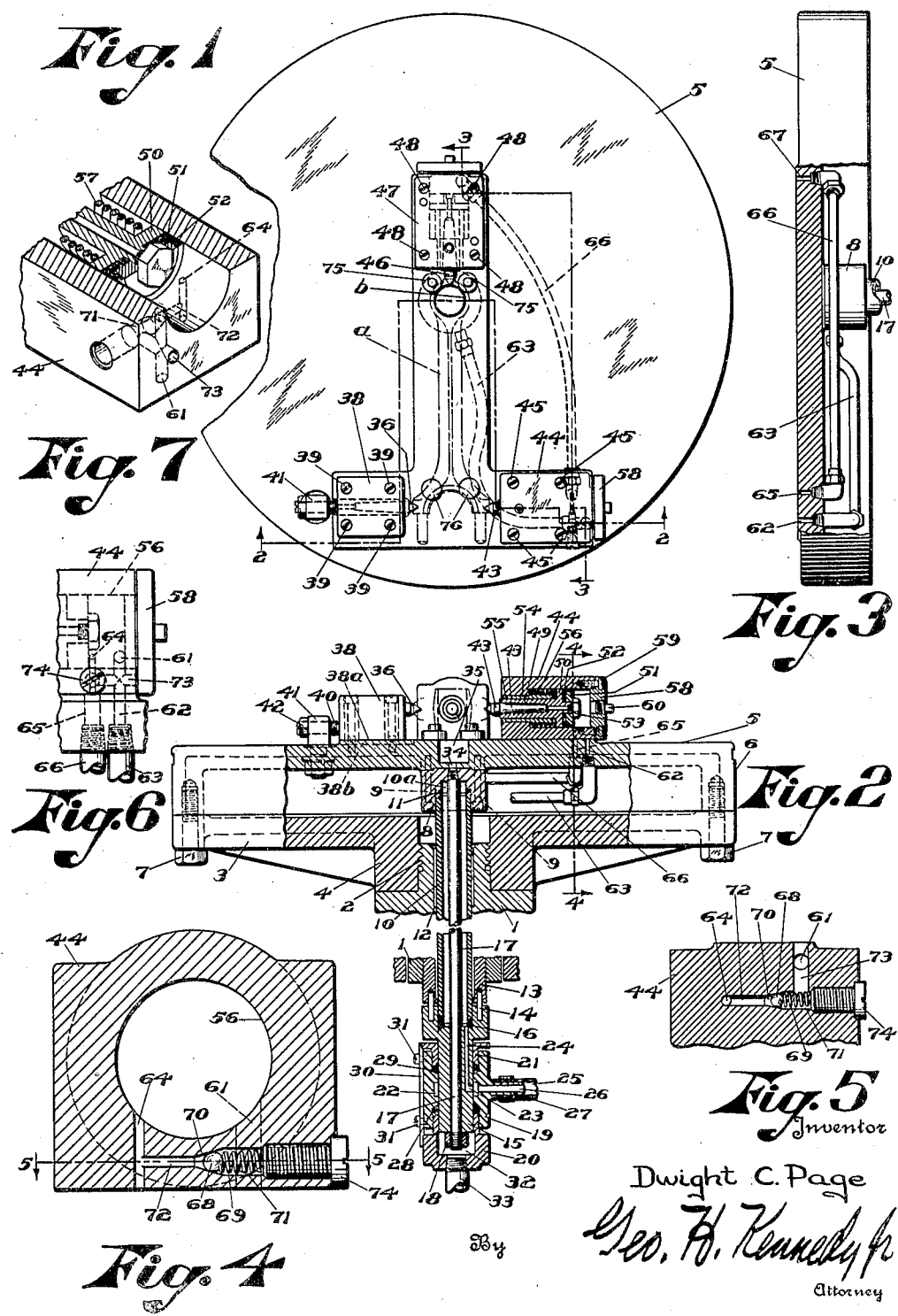
Inventor
Dwight C. Page
By Geo. H. Kennedy Jr.
Attorney Patented Oct. 6, 1931

1,825,677

UNITED STATES PATENT OFFICE

DWIGHT C. PAGE, OF WORCESTER, MASSACHUSETTS, ASSIGNOR TO THE HEALD MACHINE COMPANY, OF WORCESTER, MASSACHUSETTS, A CORPORATION OF MASSACHUSETTS

WORKHOLDING APPARATUS

Application filed November 19, 1928. Serial No. 320,350.

This invention relates to work-holding apparatus, and more particularly to apparatus for the holding or chucking of an irregularly-shaped object, such as a connecting rod, in position to present a bore or hole in such object to the action of a tool or grinding wheel for operation internally of said bore. Ordinarily the operation of grinding such a bore must locate and fix the bore axis at a definite distance from some other part of the object,—in a connecting rod, for example, the axis of the wrist pin bore or hole must be a definite distance away from the bearing at the other end of said rod. Therefore, in grinding the wrist pin bore or hole of a connecting rod or like object, it is customary to engage such object with holding devices at three points;—the object is held by two so called "centers" which definitely locate the end or bearing portion furthest removed from the bore to be ground, while a third so-called "center" contacts with a portion of the object just outside the bore in order that the axis thereof may be in the center of the object on a line perpendicular to the length of the object.

Such being the usual method of holding these articles, it is apparent that the manual chucking and unchucking thereof consumes some time, which in the grinding of a great quantity of these articles totals up into an appreciable loss in production. One of the main objects of the invention comprises the actuation and control of a chuck of this character by fluid pressure means, whereby the operator may locate and fix the workpiece in the chuck by simply presenting it thereto and turning a valve.
Another object of the invention is to provide means whereby the movement of one of the "centers" in response to opening of the valve precedes and controls the movement of another "center". It will be plain that should the "center" which locates the portion of the object adjacent the bore to be ground, move first, then the object would be pushed beyond the range of the other "centers"; hence the invention contemplates operation of the holding device adjacent the bore, only after the other holding device is operated.

The above and other advantageous features of the invention will more fully appear from the following detailed description taken in connection with the accompanying drawings in which:—

Fig. 1 is a front elevation looking at the face end of the chuck.

Fig. 2 is a view partly in elevation and partly in section, the sectional portions being taken on the line 2—2 of Fig. 1, and the chuck carrying spindle being shown in longitudinal section; in this view, the axis of the chuck is represented as vertical instead of horizontal, as would usually be the case, merely for convenient disposition of the figures.

Fig. 3 is a view partly in side elevation and partly in section on the line 3—3 of Fig. 1 of the front plate of the chuck.

Fig. 4 is a sectional view taken on the line 4—4 of Fig. 2.

Fig. 5 is a sectional view taken on the line 5—5 of Fig. 4.

Fig. 6 is a side elevation of one of the cylinder blocks.

Fig. 7 is a fragmentary isometric view of one of the cylinder blocks cut in section, showing ports and passages therein in dotted lines, and with a certain check valve omitted.

Like reference characters refer to like parts throughout the drawings.

Referring to Fig. 2, there is shown at 1 the outer end of a chuck carrying spindle which may be of the general form used in grinding machines or other machine tools. It will be readily understood that the spindle 1 is suitably journalled for rotation in the grinding or other machine in connection with which the chuck of the invention is employed. Neither the journals for the chuck carrying spindle nor the driving means therefor are herein shown, since same form no part of my invention and may be of any usual or desired form.

The end of the spindle 1 is screw-threaded as shown at 2 in order that a plate or disc 3 having an internally threaded hub 4 may be fastened thereto. The frame of the chuck comprises the aforesaid plate 3 and a face plate 5, the latter having an annular flange 6 abutting the face of the back plate, bolts 7 serving to hold these parts together. Upon the outside of the face plate 5 are mounted the several instrumentalities which are actuated by fluid pressure means, preferably air, to center and grip a workpiece, here shown as the connecting rod $a$, providing at one end the wrist pin hole or bore $b$ which is to be ground and finished to a given size, with the axis of said bore at an exact distance from the bearing at the other end of said rod. Before describing the instrumentalities carried by the face plate 5 for centering and holding the workpiece $a$ in the desired relation, reference will be made to the way in which the pressure fluid, for operating said instrumentalities, and the coolant fluid, ordinarily used in the grinding operation, are introduced to the chuck or work-holding apparatus, through its rotating spindle 1.

Still referring to Fig. 2, a generally cylindrical block 8 is attached, as by means of screws 9, 9 to the inside of the face plate 5. The axis of this block 8 coincides with the axis of the chuck, and the block serves for the support at the forward end thereof of a pressure fluid conveying pipe 10, which seats in a cylindrical chamber 10a provided by said block, packing 11 being provided to make the connection fluid-tight. The pipe 10 rotates with and is suitably supported by the spindle 1, as shown at 12;—an externally threaded member 13 which is screwed into the spindle 1 serves for the support of the pipe 10 at the rear of said spindle.

Coupled to the member 13 by means of pins 14, 14 is a generally cylindrical member 15 into the front end of which the pipe 10 extends, packing 16 being provided to make an air-tight connection between said pipe and said member. It will be readily seen that the member 15 is compelled to rotate with the spindle 1.

A coolant conveying tube 17 is located in the axial center of the pipe 10 and extends from the cylindrical block 8, into which it is screwed, completely through the said pipe 10, and through a bore provided in the member 15. The coolant tube 17, besides having the function indicated, serves to hold the block 8, the pipe 10, and the member 15 together against any pressure exerted by the pressure fluid, there being a nut 18 in screw-threaded engagement with the end of the pipe or tube 17 for this purpose.

Surrounding the normally rotating cylindrical member 15 is a stationary gland unit comprising a hollow cylindrical member 19, a coupling member 20 and a packing nut 21. An annular groove 22 is formed in the interior of the member 19, and this groove registers with a port 23 provided in the side of the cylindrical member 15. The port 23 communicates by means of a longitudinal passage 24 with the interior of the pipe 10 and in this manner the pressure fluid, which as before stated is preferably compressed air, is introduced to the rotating chuck from a stationary source of supply, as by means of any tube or pipe 25 connected to the annular groove 22 by a passage 26 formed in a coupling extension 27 on the side of the cylindrical member 15. In order that the compressed air may not escape between the rotating member 15 and the stationary member 19, glandular packings 28 and 29 are provided at the end of enlarged threaded bores in the member 19; the coupling member 20 on the one hand and the packing nut 21 on the other hand, which are also screw-threaded, being used to compress the packings 28 and 29 to any desired amount. When the connection has been made air-tight still allowing the revoluble parts to move without undue friction inside the stationary parts, the aforesaid coupling and packing nut may be fastened in position against turning by means of a lock plate 30, which is screwed onto the member 19 as by means of screws 31, 31.

The central tube or pipe 17 opens into a chamber 32 provided in the coupling 20, and into this chamber 32 the coolant fluid, usually water, is admitted as by means of a pipe or tube 33 which, of course, does not rotate. It will be apparent that the gland or packing 28, besides preventing escape of air, will likewise prevent escape of the coolant fluid.

The means for introducing the two fluids into the rotating chuck having thus been set forth, in so far as the water or other coolant fluid is concerned it remains only to point out that there is a central axial hole 34 through the front plate 5 which registers with the front end of the tube 17, and through which the coolant fluid flows onto the internal surface of the workpiece being ground, there being a cylindrical depression 35 in the front plate 5 just in front of the hole 34 to allow the coolant to start its parabolic descent sufficiently to the rear of the workpiece so that it will strike the internal peripheral surface thereof.

Referring now to Figs. 1 and 2, the end of the workpiece $a$ that is not to be ground is held by means of a stationary "center" and a movable "center", while that portion of the workpiece having the internal bore to be ground is held by a movable "center." Each "center" is held by a block or a cylinder, as clearly shown in Fig. 1.

The stationary "center" is indicated by the reference numeral 36 and is located in a block 38 fastened to the face plate 5 by means of screws 39. The block 38 furnishes a projecting portion 38a which fits into a slot 38b in the face plate 5, in other words this makes a tongue and groove arrangement whereby the block 38 carrying the "center" 36 can be adjusted. To allow for this adjustment the simple expedient of having the screw holes, in the block 38, slightly larger than the screws 39 is resorted to. To this end an adjustment screw 40 passing through a lug 41 bolted to the face plate 5, as best shown in Fig. 2, bears against one end of the block 38. A lock nut 42 is provided to hold the screw 40 from turning once the proper adjustment has been made. The movable "centers" are held by piston rod members integrally attached to piston units that fit in the cylindrical bores of the holding blocks. The holding block for the movable "center" 43 that is located opposite to the "center" 36 is designated by the reference character 44, being fastened to the face plate 5 by means of screws 45. The movable "center" 46, close to the axial center of the chuck, is located in a block 47 fastened to the face plate 5 by means of screws 48. The construction of the cylinder and piston units which actuate the "centers" 43 and 46 being the same, one description thereof will now be given for both.

As shown in Fig. 2 in the case of the "center" 43 and its holding block 44, each "center" 43 and 46 fits in a tapered bore formed in a member 49. One end of the member 49 provides an enlarged cylindrical portion 50 between which and an annular disc 51 is a leather washer 52, these three parts comprising the piston, the annular disc 51 being held to the member 49 by means of a small bolt 53. The member 49 fits in a surrounding sleeve 54 which in turn fits in the smaller of two bores 55 and 56 provided by the blocks 44 and 47. The piston comprising the annular disc 51, the enlarged portion 50 and the leather washer 52 slide in the larger bore 56;—said bore also incloses a spring 57 which at one end thrusts against the shoulder which divides the bore 55 from the bore 56 and at the other end against the enlarged portion 50 thus tending to force the piston to the right, Fig. 2. The open end of each cylindrical chamber 56 is closed by means of a cylinder head 58 fastened to the block or cylinder by means of screws 59. A screw threaded plug 60 is preferably provided to give easy access to the interior of the cylinder for the purpose, for example, of introducing lubricating oil thereinto.

It will be obvious from the above description that whenever fluid under pressure is introduced into the cylindrical bore 56 between the pistons 50, 51, and 52 and the cylinder head 58 the said piston, together with the piston rod member 49 and the "center" 43 or 46, as the case may be, will be urged toward a workpiece a. It will be equally plain that whenever the pressure is exhausted from the said cylindrical chamber 56, the spring 57 will serve to retract the "center".

Referring to Figs. 3, 4, 6, and 7, a port or passage 61 is provided through the block 44 on the rear side thereof, said passage communicating with the cylindrical bore 56 in said block adjacent the cylinder head 58. This passage 61 is in line and communicates with a passage 62 through the front plate 5. Piping 63 located between the front and back plates 5 and 3 of the chuck connects the passage 62 to the chamber 10a, and thus it will be seen that whenever the operator of the machine moves a valve, not shown, provided on any desired part of the machine, to allow the pressure fluid to flow through the pipe 25, the said pressure fluid will go by the connections described to the cylindrical bore 56, and this will result in movement of the piston unit contained in the block 44, projecting the "center" 43 to the position shown in Figs. 1 and 2.

The "center" 46 will not move into operative position until the "center" 43 has moved. As best shown in Figs. 2, 4, 6, and 7, a port or passage 64 is provided through the block 44 at the rear side thereof, said port or passage communicating with a passage 65 through the front plate 5. Piping 66 between the plates 3 and 5 connect said passage 65 to another passage 67 through the front plate 5 which opens into a passage through the block 47 leading into the internal bore 56 thereof. The port 64 opening into the bore in the block 44 is so located that it will be uncovered by the corresponding piston unit 50, 51 and 52 only when the latter has been moved practically to its extreme left-hand position, and thus, then, and only then, is the pressure fluid admitted to the cylinder inside the block 47 to move the piston unit therein to carry the "center" 46 into engagement with the workpiece a.

In using the chuck of the invention, a workpiece a may be generally located in position by means of locating buttons 75, 75 and 76, 76, which are best shown in Figs. 1 and 2. These locating buttons are so arranged that they approximately fix the object to be ground by contact with curved surfaces thereon. The object having thus been generally located, the "center" 36 should be placed in a conical depression provided in the side of the workpiece, and then the air valve may be manipulated. This will cause the opposite "center" 43 to come in engagement with the workpiece and immediately thereafter the "center" 46 adjacent the bore to be ground will move into position. This action takes place in less than one second.

The workpiece is now held on the rotating chuck rigidly in proper grinding position. When the grinding operation has been completed on the bore *b* of the workpiece *a*, the workpiece can be released by again operating the air valve to disconnect the supply of air from the tube or pipe 25 and open said tube to the atmosphere. It will be readily apparent that the compressed air in the cylinder in block 44 will quickly exhaust through the port or passage 61, passage 62, and connections already described, and that therefore the piston 50, "center" 43 and associated parts will move back to their original position in said block. Prior to the time that the leather washer covers the port 64, air can and will exhaust from the cylinder in the block 48 by way of the same passages and connections through which it entered thereinto, but with the closure of this port 64, this means of egress is cut off. To the end that the "center" 46 may nevertheless rapidly withdraw into its original position, I have provided a shunt passage connecting the piping 66 to the piping 63, said shunt passage having a check valve therein to prevent the passage of air in the opposite direction in order that the "center" operated by the piston in cylinder block 44 may move first, as already described.

As shown in this particular embodiment of the invention, referring particularly to Figs. 4 and 5, a ball 68 is urged by a spring 69 against a tapered seat 70 which connects a large diameter passage 71 with a small diameter passage 72, the latter communicating with the passage 64 that leads air or other fluid from the first block 44 to the second block 47, and the passage 71 communicates by way of a cross passage 73 with the passage 61 that connects to the pipe 63 leading to the air supply or exhaust. A screw 74 located in the bore 71, which is internally threaded for that purpose, backs up the spring 69. It will be readily apparent that compressed air may readily exhaust from the passage 64 to the passage 61, through the passages 72 and 73, the spring 69, which is light, yielding for that purpose, but that air cannot enter the passage 64 and thence into the piping 66 from the passage 61 when the apparatus is being operated to close the "centers".

Although I have described my invention in connection with so-called "centers" for holding a workpiece, it will be apparent that any other form of work-gripping apparatus or device might be substituted therefor, and consequently I wish it understood that my invention is not limited to the apparatus herein shown; different means for gripping the work might be employed and many other changes made without departing from the invention as set forth in the following claims.

I claim:

1. In apparatus of the class described, the combination with a pair of movable work-holding members cooperating with each other and fluid pressure means to operate them, of means to insure movement of one of said work-holding members prior to movement of the other of said work-holding members.

2. In apparatus of the class described, the combination with a pair of cylinder units, a pair of piston units, work-holding members carried by said piston units, a fluid pressure port to admit fluid pressure to one of said cylinders, and a port in said cylinder adapted to be uncovered by movement of the piston unit therein to admit pressure fluid to the other of said cylinders.

3. In apparatus of the class described, a chuck body, a pair of work gripping devices facing each other and located near the periphery of said body, one of said devices being movable and the other being relatively stationary, fluid pressure means for moving the movable device, a third work-holding device near the center of said body and movable in a line perpendicular to a line connecting the first two work-holding devices, and a second fluid pressure means for moving said third device.

4. In apparatus of the class described, a movable work-holding member, fluid pressure means to move said member, a second movable work-holding member, fluid pressure means to move said second member, fluid pressure connections to operate the second member including a port which is opened by the movement of the first member whereby the second member is not operated until the first member moves, and a check valve to allow the fluid to exhaust from the second member irrespective of the position of the first member when the supply of fluid is cut off.

5. Apparatus of the class described for holding and rotating an irregularly-shaped workpiece, to secure operation of a tool in a bore near one end of said workpiece, comprising a rotary body, a pair of relatively movable work-engaging devices carried by said body remote from its axis of rotation, to grip said workpiece near the end thereof removed from said bore, a third work-engaging device carried by said body near its axis of rotation, to engage said workpiece adjacent said bore, and fluid-pressure means for operating one of said pair of work-engaging devices and said third work-engaging device in sequence.

6. Apparatus of the class described for holding and rotating an irregularly-shaped workpiece, to secure operation of a tool in a bore near one end of said workpiece, comprising a rotary body, a pair of relatively movable work-engaging devices carried by said body remote from its axis of rotation, to grip said workpiece at opposite predetermined points near the end thereof removed from said bore, a third work-engaging device carried by said body near its axis of rotation and movable substantially at right angles to said other work-engaging devices to grip said workpiece near said bore, and means for procuring the operations in sequence first of said pair of work-engaging devices and then of said third work-engaging device, whereby to locate the axis of said bore at a given distance from said predetermined points on said workpiece engaged by said pair of work-engaging devices.

DWIGHT C. PAGE.